United States Patent
Sahinci et al.

(10) Patent No.: US 6,478,482 B1
(45) Date of Patent: Nov. 12, 2002

(54) ATTENUATING SPLICE, SYSTEM, AND METHOD THEREFOR

(75) Inventors: Erin Sahinci, Laurel; Waqar Mahmood, Columbia; Andrei Csipkes, Ellicott City, all of MD (US)

(73) Assignee: Ciena Corporation, Linthicum, MD (US)

( * ) Notice: Subject to any disclaimer, the term of this patent is extended or adjusted under 35 U.S.C. 154(b) by 149 days.

(21) Appl. No.: 09/593,354

(22) Filed: Jun. 14, 2000

(51) Int. Cl.$^7$ .............................................. G02B 6/255

(52) U.S. Cl. ............................ 385/98; 385/96; 385/97

(58) Field of Search .................................... 385/95–98

(56) References Cited

U.S. PATENT DOCUMENTS

| | | | |
|---|---|---|---|
| 4,557,557 A | 12/1985 | Gleason et al. | 350/96.21 |
| 4,884,859 A | 12/1989 | Yamamoto et al. | 350/96.15 |
| 5,142,603 A | 8/1992 | Forrester | 385/98 |
| 5,398,296 A | 3/1995 | Lin et al. | 385/96 |
| 5,588,087 A | 12/1996 | Emmons et al. | 385/140 |
| 5,897,803 A * | 4/1999 | Zheng et al. | 219/383 |
| 6,062,743 A * | 5/2000 | Zheng et al. | 385/100 |

FOREIGN PATENT DOCUMENTS

EP 0690318 A1 * 1/1996 .......... G02B/6/255

* cited by examiner

Primary Examiner—Hemang Sanghavi
Assistant Examiner—Omar Rojas, Jr.
(74) Attorney, Agent, or Firm—Michael R. Camarata (57) ABSTRACT

A method of controlling an optical fiber splicing machine utilizes a power control mode to control the amount of power delivered to fuse the fibers. In the power control mode, the attenuation is measured while the fusing process is occurring. The power control mode shuts down the splicer when the measured insertion loss is less than or equal to the target insertion loss value plus a margin value. The margin value accounts for the transient attenuation difference value indicative of the changing attenuation as the splice cools. If the desired attenuation is not achieved, an energy control mode is utilized which controls the amount of energy delivered to fuse the fibers. After delivering this energy, the method measures the attenuation. If not within desired values, the energy mode is repeated. At each iteration the splicing control function utilized by the energy control mode may be reprogrammed. With these techniques, optical fibers may be spliced having a controlled attenuation to within +/−0.1 dB or better. A system for performing the attenuating splice uses, in addition to a optical fiber splicing machine, a laser and power meter to measure insertion loss as well as a controller to implement the splicing methods.

19 Claims, 8 Drawing Sheets

ATTENUATING SPLICE, SYSTEM, AND METHOD THEREFOR

BACKGROUND OF THE INVENTION

1. Field of Invention

This invention generally relates to fiber optics and, more particularly, to optical communications systems or components thereof which utilize a fiber splice.

2. Description of Related Art

Conventional splicing operations and equipment are designed to minimize or eliminate optical signal attenuation. To that end, conventional splicing machines are designed to bring the two fibers into as perfect an alignment as possible. This goal of achieving optimum alignment between the fibers is met by utilizing various detectors and fine alignment control functions so that the fibers are aligned. Typically, the respective optical axes are aligned first and then the fibers are brought together so that their ends are in direct contact.

Conventional splicing machines utilize an electric arc to fuse the fibers. Such machines permit an operator to set fusing current, fusing time and fine tune fiber alignment to achieve the best alignment possible between the fibers. Such conventional splicing machines are designed to minimize the insertion loss or attenuation of the resulting splice by, for example, accurately aligning the fibers. These conventional splicing machines may be programmed according to various recipes that specify optimum fusing currents and fusing times for a variety of fiber types, core diameters and other fiber properties.

Such conventional splicing machines also permit an operator to intentionally misalign the fibers in a crude effort to perform an attenuating splice. Using various recipes similar to those mentioned above, an operator can construct an attenuating splice. This conventional attenuating splice operation requires a high degree of operator experience to choose the proper parameters such as fusion time and current. Furthermore, these operations are labor intensive and include typing in the large number of parameters at each step. The success rate also varies with the skill of the operator, machine condition, and environmental conditions. Even with an experienced operator and ideal conditions, these conventional techniques cannot provide an accurate attenuation value.

Various other conventional techniques exist for constructing attenuating splices. Gleason et al. (U.S. Pat. No. 4,557,557), for example, heats aligned optical fiber ends until they are in a plastic state. Then, the fiber ends are physically distorted by axial movement of one of the fiber ends. The amount of movement is controlled according to a measured optical loss across the splice. The fusion splice formed by this technique imposes a lumped optical loss value between the fiber ends. Yamamoto, et al. (U.S. Pat. No. 4,884,859) also heats aligned optical fiber ends to a temperature sufficient to soften the materials and then applies a tension and/or twist to the fiber to thereby form an optical attenuation area having fine cracks that scatter light. A major shortcoming of such techniques is the amount of attenuation is very difficult to control.

Forrester (U.S. Pat. No. 5,142,603) is another example of constructing a fusion splice with a controlled attenuation. Forrester fuses the ends of aligned fiber ends with heat. Once fused, the heat is continued for a time period sufficient to cause dopant to migrate out of the core and result in a desired attenuation.

Lin, et al. (U.S. Pat. No. 5,398,296) constructs a mode filter overlapping the fiber ends such that the fiber ends are parallel and overlapping. These overlapping fiber ends are then welded. Lin slightly separates the fibers to pull and narrow the welded portion. As the fibers are being separated, a power meter is monitored. When the readout reaches an object value, e.g. 3 dB, the process is stopped and the fibers are cooled. A material having a high index of refraction is then applied to the welded portion to form a mode filter.

Emmons, et al. (U.S. Pat. No. 5,588,087) constructs an overlapping fusion attenuator by overlapping two fiber ends to define an overlapped portion of the fibers. Heat is then applied to the overlapped portion by energizing an electric arc for about one second. The transmission loss is then measured and, if greater than a desired loss, the electric arc is turned on again for the same time period. As a result, the cores move closer together in the overlapped portion which results in a reduced transmission loss. This technique has serious shortcomings and can only produce at attenuation of greater than 10 dB. Alternative embodiments produce lower attenuation values by moving the fibers relative to one another in much the same way as described above to change the attenuation value.

SUMMARY OF THE INVENTION

The invention adds or otherwise produces a highly-controlled amount of attenuation in a fiber splice during the fiber splicing process. This process includes intentionally misaligning fiber cores during the splicing operation. Such intentional misalignment increases the insertion loss of the resulting splice.

In addition, the method disclosed here accurately controls the amount of attenuation introduced in the fiber splice. The degree of control is quite excellent and allows the manufacture of attenuating splices having an insertion loss that is controlled within +/−0.25 dB and, preferably, within +/−0.1 dB or less.

To this end, the inventive methods control the total amount power applied to the fibers during the fusing process. When utilizing an electric arc as the energy source, the invention may control the amount of power by controlling the driving current applied to the arc.

The inventive methods may exercise this control in a so-called power control mode or shut-down mode wherein the driving current is applied until the measured insertion loss is within a margin of the desired insertion loss value. As the hot splice cools, the insertion loss decreases and will settle at a value close to the desired insertion loss value. The shut-down mode operates while the fiber is energized and connected to a power meter. By monitoring the power meter, the method can determine when the insertion loss is within the desired margin and then shut down the energy source fusing the fibers.

The inventive method may also utilize an energy control mode or repeat mode either alone or in conjunction with the shut-down mode. The repeat mode changes the energy applied to the fibers during the splicing operation. When utilizing an electric arc as the energy source, the invention may control the driving current as well as the time the driving current is applied to fuse the fibers. The fused fibers are preferably allowed to cool and then a reading is taken of the insertion loss. If the insertion loss is not acceptable, then the process is repeated until the insertion loss is within the desired range.

With any one of these methods, the invention can eliminate conventional optical attenuators. Such conventional optical attenuators are relatively expensive, discrete components and the elimination thereof would reduce the cost and complexity of the resulting optical circuit and increase reliability. By eliminating conventional optical attenuators, the invention also eliminates at least two splices (or connectors) that were previously used to put the attenuator into the fiber line. System reliability is increased by reducing the number of separate components in the system.

A more significant advantage of the invention is that conventional attenuators are only available in fixed integer values such as 1 dB, 5 dB, and 10 dB. Fine tuning the attenuation of a given optical circuit is impossible with such conventional attenuators. In contrast, the invention permits an optical circuit attenuation to be fine tuned to non-integer values.

Furthermore, the attenuation can be designed directly into the optical circuit. Because splices are quite common and provided at myriad locations in an optical circuit, the invention can be utilized to fine tune the attenuation at any of these locations. A fiber could also be cut and spliced for the sole purpose of adding a desired, precisely controlled attenuation at any point in the fiber. In other words, this unique splicing process can be utilized to introduce controlled amounts of attenuation at selected splice points in the fiber line thereby providing industry with new and useful techniques. The degree of control and accuracy of the resulting attenuation provides significant advantages when compared with conventional devices and techniques.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF INVENTION

Figure 1:
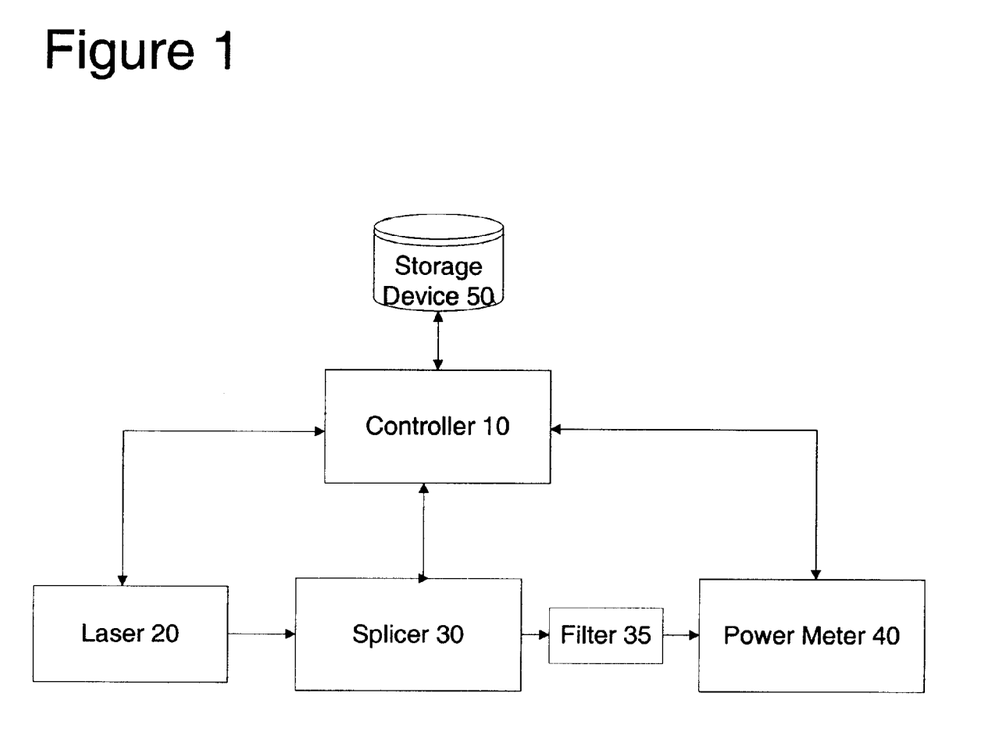
FIG. 1 is a block diagram of a system according to the invention that manufactures an attenuating splice.

FIG. 1 illustrates a system for performing attenuation splicing operations. The system includes a controller 10 operatively connected to a laser 20, splicer 30 and power meter 40. The controller 10 may be constructed, as illustrated in FIG. 1, with a personal computer programmed with software embodying the inventive methods. Alternatively, the controller may be constructed with an ASIC (application specific integrated circuit) or other hardware, firmware and/or software designed perform the inventive methods. The specific implementation and/or programming of these devices is a routine matter to one of ordinary skill in the art. If the inventive methods are reduced to software, then such software may be written onto a computer disc or another computer-readable medium as further described below.

More specifically, the controller 10 is suitable for programming with the inventive methods. To allow human interaction, the controller 10 may include conventional input devices such as a keyboard and mouse as well as an output device which may include a display such as a cathode ray tube, flat panel display and/or printer.

Preferably, the controller 10 is connected to a storage device 50. The storage device 50 may be a hard disk, floppy disc, optical disc, etc and may also include associated drive and interface circuitry. The storage device 50 may be used to store data as well as a computer program which performs the invention when loaded into the controller 10. As an alternative, the storage device as well as the other components of the system may be connected with a network instead of the direct connections illustrated in FIG. 1.

The computer program embodiment of the invention may be loaded from the storage device 50 into an internal memory of the controller 10. The result is that a general purpose controller 10 is transformed into a special purpose machine that implements the invention.

Even more particularly, each step of inventive method will transform at least a portion of the general purpose controller 10 into a special purpose computer module implementing that step.

Other embodiments of the invention include firmware embodiments and hardware embodiments wherein the inventive method is programmed into firmware (such as EPROM, PROM or PLA) or wholly constructed with hardware components. Constructing such firmware and hardware embodiments of the invention would be a routine matter to one of ordinary skill using known techniques.

Still further, the invention disclosed herein may take the form of an article of manufacture. An article of manufacture is a computer-usable medium, including a computer-readable program code embodied therein wherein the computer-readable code causes controller 10 to execute the inventive methods.

A computer diskette such as storage device 50 is an example of such a computer-usable medium. When the disc 50 is loaded into the disc reader of the controller 10, the computer-readable program code stored therein is transferred into the controller 10. In this way, the controller 410 may be instructed to perform the inventive methods disclosed herein.

The laser 20 is connected via a fiber optic cable to the splicer 30. Laser 20 is preferably tunable because insertion loss may vary or otherwise depend upon the operating wavelength. In other words, the controller 10 may control laser 20 to select the wavelength of light emitted by the laser 20. Because laser 20 is used to measure the insertion loss of the splice, selecting the operating wavelength at which the splice is expected to operate will generally increase the accuracy of the insertion loss measurement.

The splicer 30 may also be referred to herein as a fiber optic splicing machine or apparatus. Splicer 30 is a conventional element which permits two optical fibers to be fused. The fused fibers form a splice. To perform the splice, the splicer 30 may include appropriate clamping and micro-positioning mechanisms to hold and align the optical fibers. Various detectors are typically used by such splices 30 to measure fiber alignment.

Such splicers 30 also include the ability to offset the optical fibers such that they are not axially aligned. Although the invention is primarily directed to axially misaligned fibers, it is also possible to apply the inventive methods to so-called "overlapped" fibers in which the fibers overlap in the Z direction. Axially misaligned fibers are generally preferred herein because the attenuation properties of the splice are more easily controlled. Nevertheless, overlapped fiber splicing can also be improved with the inventive methodologies.

The splicer 30 includes a device that fuses the fibers. Such fusing devices include an electric arc, a torch (e.g. chlorine mantled oxyhydrogen torch), a laser, and/or other heater that heats the fiber ends to a temperature sufficient to cause fusion thereof. Such fusion devices in the splicer 30 are controlled by the controller 10 to fuse the fibers.

As more specifically described below, this control includes controlling the power and/or energy applied by the fusing device in the splicer 30. If an electric arc is being used, the power and energy can be conveniently controlled by adjusting the fusing current I and fusing time t. For example, the power P (rate of energy delivery) delivered by an electric arc type fusing device may be expressed as $P=I^2R$ and the energy delivered E may be expressed as $I^2Rt$ where R is the resistance across the arc and t is the time period in which the power P is delivered. In other words, the energy E is an integration of the power over time. The controlled parameters include I and t. It is to be understood that the various other type of fusing devices can be controlled by the invention to deliver a desired amount of power and/or energy.

If a laser is used as the fusing device in splicer 30, then an optional optical filter 35 may be used to filter out the fusing device laser wavelengths and permit the measuring laser 20 wavelengths to be accurately detected by the power meter 40. Filter 35 may be used for other purposes as described below in the operational section and may comprise multiple filter elements.

Power meter 40 is optically connected to the splicer 30 via, for example, one of the fibers being spliced. Power meter 40 is also a conventional element in and of itself and generally has the capability of measuring or otherwise detecting the degree of attenuation across the splice (insertion loss, which may be measured in decibels (dB). The controller 10 inputs or receives one or more insertion loss values from the power meter 40.

Operation of Invention

The operation of the invention will now be described in reference to FIGS. 2–8.

Figure 2:
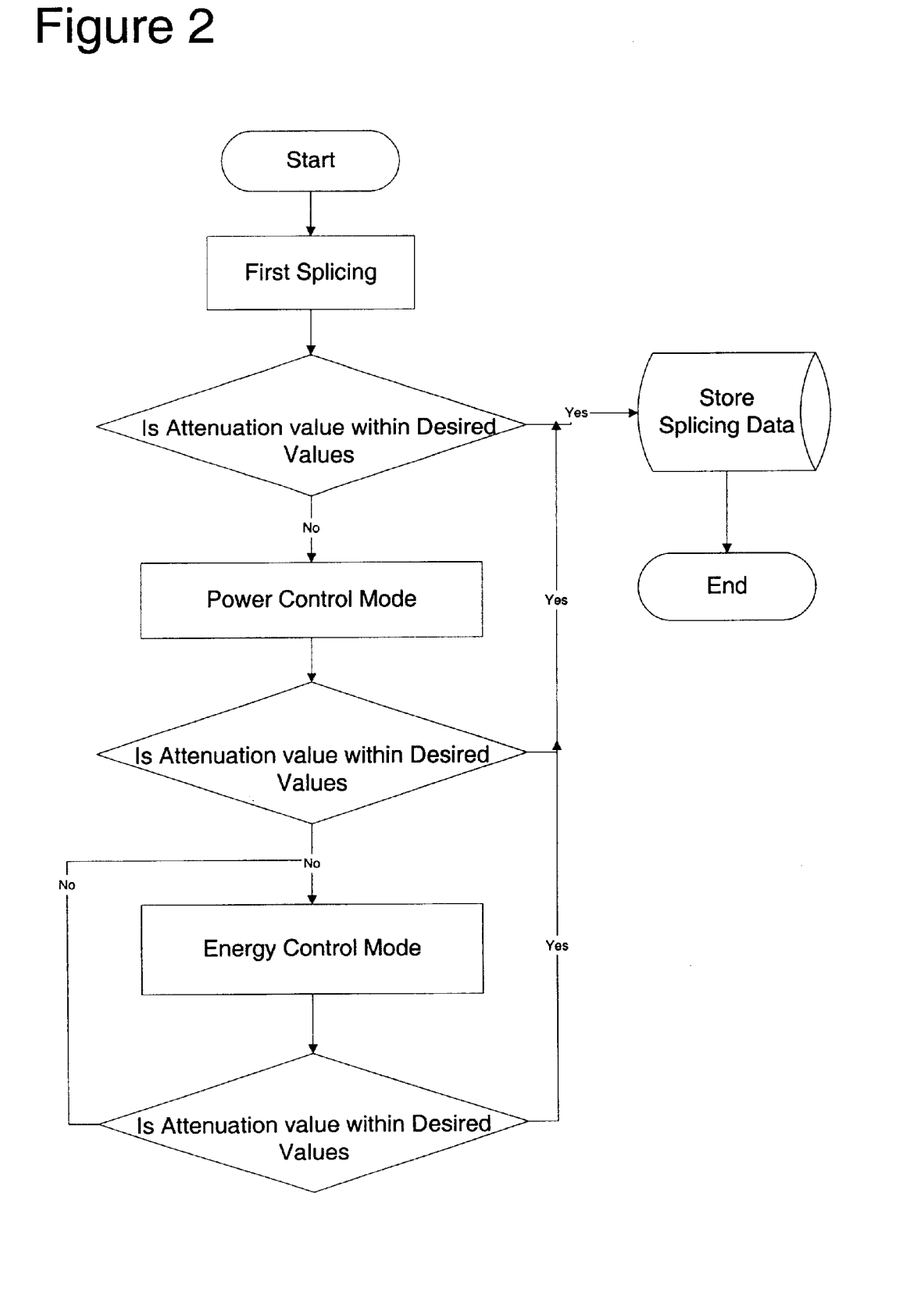
FIG. 2 is a high level flow diagram showing a combined power mode and energy mode control method according to the invention for performing attenuation splicing.

The high-level flowchart of FIG. 2 illustrates a combined methodology in which the inventive power control mode and energy control mode are utilized in conjunction and to advantage. This combined method may begin with a first splicing process which is a conventional splicing process that splices two fibers together. There is a chance, albeit quite small, that the conventional splicing operation will produce a splice with the desired insertion loss. This small probability is tested and, if the splice has an attenuation value within the desired values, splicing data is stored by the controller 10 in the memory device 50 and the process ends.

The splicing data stored in FIG. 2 includes a splicing recipe. Conventional splicing operations typically utilize a splicing recipe which may include a large number of parameters. These parameters include various fiber properties such as fiber type, core diameter, cladding diameter, etc. If the first splice happens to produce a desired attenuation at the operating wavelength for the particular fibers being splice, then the method stores this data for future use. However, the repeatability and/or predictability of such recipes is very poor and may be due, in part, to varying environmental and/or splicing machine conditions. For example, wearing of the electrodes of an electric-arc-type splicer will change the attenuation value of a splice even if the same fibers having the same properties are fused.

If the first splice does not produce a splice with the desired attenuation value, which is almost all cases, the method will proceed to the power control mode. Alternatively, the first splice and decision step may be skipped altogether with the resulting method starting with the power control mode.

The power control mode, in general, controls the amount of power delivered to the fibers during the splicing operation. For example, the power of an electric-arc-type splicer 30 may be controlled by controller 10 commanding the splicer 30 to deliver a current I to the electric arc. The power control mode measures the splice insertion loss while the fusion is occurring. This controller 10 performs this measurement by energizing laser 20 while controlling splicer 30 to fuse the fibers. Power meter 40 reads the attenuation across the splice and either outputs the attenuation value to the controller 10 or makes the value available for retrieval by controller 10. Further details of the power control mode will be explained in reference to FIG. 3.

The combined method then checks whether the attenuation value is within the desired values. If so, then splicing data is stored by the controller 10 in the memory device 50 and the process ends. If not, the controller enters the energy control mode the details of which are explained in reference to FIG. 3.

Although it is possible for the energy control mode to produce a splice with the desired attenuation, the energy control mode is usually a repetitive process and, for that reason, is also referred to as a repeat mode. This is illustrated in FIG. 2 with the loop that is formed by the decision step following the energy control mode. The energy control mode is repeated until the attenuation value of the splice is within the desired values. Unlike the power control mode, the energy control mode preferably measures the attenuation after the splice is performed. In other words, the energy control mode preferably waits until the splice is completed and, perhaps, cooled until taking an attenuation reading from the power meter 40.

Figure 3:
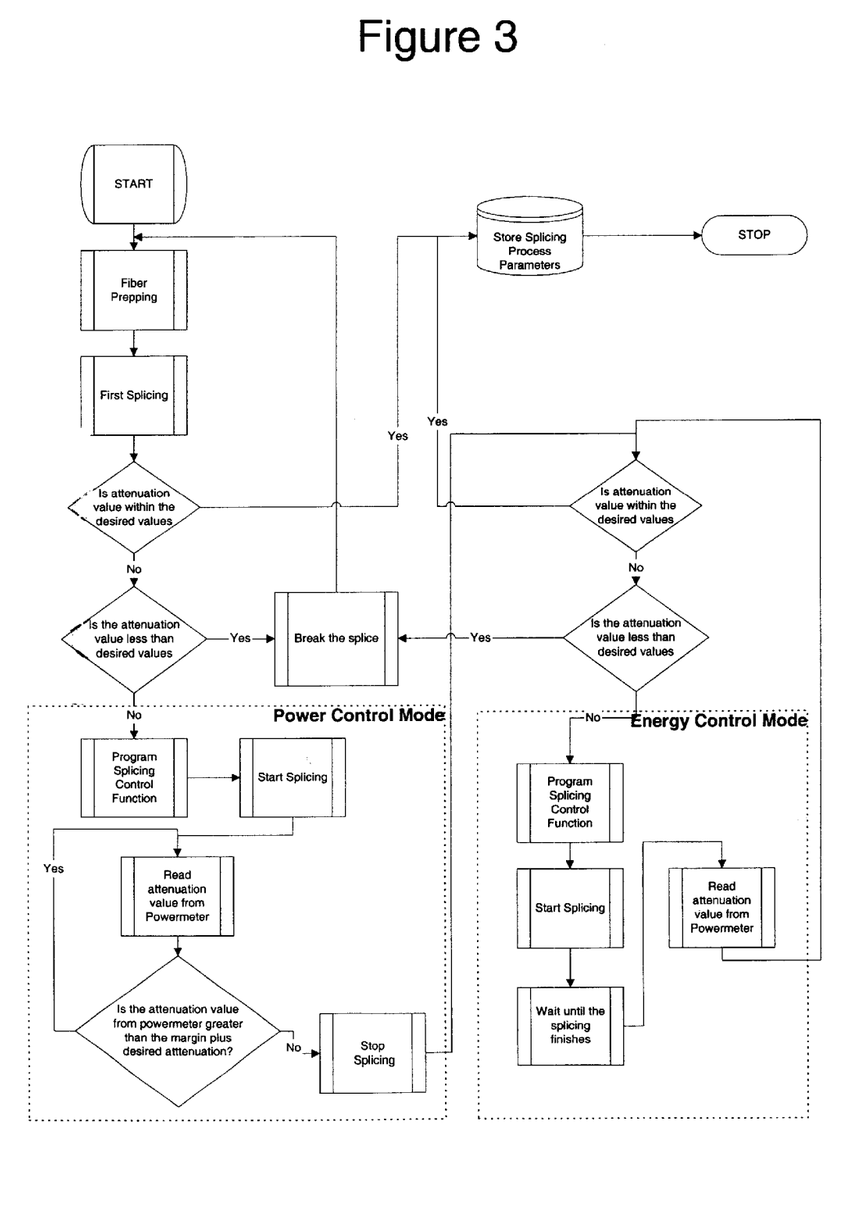
FIG. 3 is a lower level flow diagram showing details of a combined power mode and energy mode control method according to the invention for performing attenuation splicing.

FIG. 3 shows further details of the combined methodology illustrated in FIG. 2. As shown therein, the first splicing process includes a fiber prepping step that prepares the fibers for splicing by, for example, stripping the fiber optic cables and cleaning the fibers. A first splicing step may then be performed utilizing conventional splicing techniques and recipes. The first splicing step may be skipped altogether as mentioned above with the resulting method skipping from fiber prepping to the power control mode.

If the first splicing step is retained, then there is a small chance that the conventional splicing step will produce a splice with the desired insertion loss. This small probability is tested and, if the splice has an attenuation value within the desired values, splicing data is stored by the controller 10 in the memory device 50 and the process ends.

Then, the method determines whether the attenuation value is less than the desired value. If yes, then the splice must be broken and the process restarted because the following processes may only reduce and not increase the attenuation. If no, the power control mode is initiated.

The power control mode, as further illustrated in FIG. 3, programs the splicing control function. This may be accomplished by the controller 10 programming splicer 30. The splicing control function includes a recipe for the particular fibers being splices.

In addition, the splicing control function includes a power level and a margin value. The power level is indicative of the amount of power delivered by the fusing device of splicer 30 to the fibers being spliced. If an electric-arc splicer 30 is being used, the power level may be conveniently controlled by controlling the current I supplied to the fusing arc.

The margin value accounts for the transient and highly variable attenuation fluctuations (referred to herein as a "transient attenuation difference value") that occur after the fusing device of splicer 30 is turned off. Such fluctuations are caused, at least in part, by the changing surface tension as the fused portion transitions from a high-temperature melting status to a low-temperature solid status. Thus, the margin value is greater than or equal to a transient attenuation difference value. The transient attenuation difference value may be quite a large value and can cause the measured attenuation value to differ by more than 1 dB. The specific transient attenuation difference value varies with, for example, the type of fiber and even with different fiber vendors supplying the same fiber type.

The margin value may also be used to compensate for communication delays that exist between the splicer 30, power meter 40 and controller 10.

In addition, the margin value may be used to compensate for noise. For example, white noise from an electric arc type fusing device can affect the attenuation measurement. The margin value can account for this, as well as other noise parameters. Alternatively, a optical filter 35 may be optionally inserted into the optical path that exists between splicer 30 and power meter 40. This optical filter 35 may be used to filter the white noise from an electric arc type fusing device in splicer 30.

The margin value is used in the power control mode as follows. After programming the splicing control function, the controller 10 commands the splicer 30 to start the splicing operation. As the splice is occurring, power meter 40 measures the attenuation. Controller 10 receives or inputs the measured attenuation and then determines whether this measurement is greater than the margin value plus the desired attenuation. If yes, the controller 10 commands splicer 30 to continue the splicing operation at a commanded power level. If not (measurement≦margin+desired attenuation), then the splicing operation is stopped.

Figure 7:
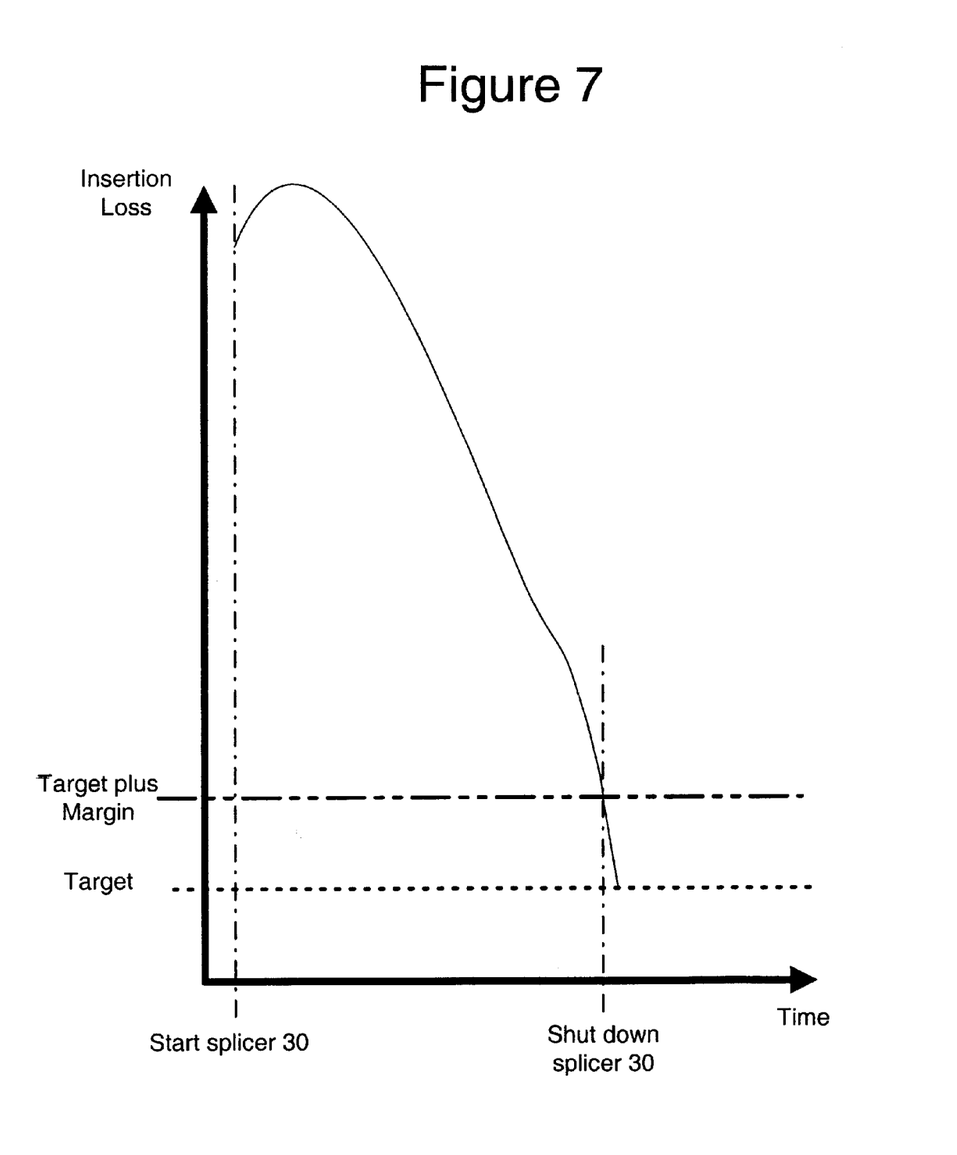
FIG. 7 is a graph showing insertion loss versus time and illustrating various concepts of the invention.

FIG. 7 is a graph of measured insertion loss versus time and further illustrates the power control mode and the invention's use of a margin value. The curve shown in FIG. 7 represents a insertion loss measurement taken during the fusing operation in the power control mode. When the fibers melt, the curve begins a downward trend towards the target (desired attenuation value) which is indicated by the dotted line. The margin value is added to the target to set a threshold which is indicated by the dashed-dot chain line. Controller 10 monitors the measured insertion loss and determines when the measured insertion loss crosses the threshold (target +margin). When this happens, controller 10 commands splicer 30 to stop the splicing operation which shuts down the fusing device of splicer 30 (which is why this mode is also referred to as a shutdown mode). The remainder of the curve (following the shut down time) illustrates the transient attenuation difference value.

The curve shown in FIG. 7 is for illustration purposes only. The shape of the curve, margin value, and shutdown time are highly variable and dependent upon a wide variety of factors. The variability of this curve is indicative of the problems facing conventional splicing techniques and the resulting poorly controlled amount of attenuation in the resulting splice. The invention overcomes these problems by dynamically measuring and controlling the splicing process. By controlling the power level and setting an appropriate margin value, the invention shuts down the splicing operation at a precisely controlled time and produces a splice having an attenuation value that is quite close if not equal to the desired attenuation value.

As further shown in FIG. 3, after shutting down the splicer 30 in the power control mode, the method proceeds by checking whether the attenuation value is within the desired values. If yes, the method has been successful and the process parameters are stored by the controller 10 in the memory device 50. The measurement for this check is preferably taken after the splice has cooled sufficiently to eliminate any significant transient attenuation.

If not, the method checks whether the attenuation value is less than desired values. This is done because the method may only be able to decrease and not increase the attenuation. If the power control mode has gone too far, the splice is broken and the process begun anew. If not, then the energy control mode is initiated.

As mentioned above, the energy control mode preferably measures the insertion loss after each successive splicing operation in the energy mode control loop. Of course, only one iteration may be required to produce a good splice. These objects are illustrated in FIG. 3 which shows the energy control mode method that begins with programming the splicing control function. In the energy control mode, the splicing control mode includes a recipe as well as an energy level indicative of the energy to be delivered by the splicer 30's fusing device. If an electric arc is being used as the fusing device, the energy level may be conveniently set by controlling the current I and time period in which the current I is supplied to the fusing device of splicer 30.

Once programmed, the splicing operation is started by the controller 10. The method then waits for the splicing to finish which may include waiting for the splice to cool. An attenuation measurement may then be taken by energizing the laser 20 and reading the insertion loss with power meter 40. The controller 10 then inputs or receives this measured attenuation value and subjects this value to the tests described above. If these tests determine that the measured attenuation value is less than the desired value, then the energy control mode is repeated.

At each iteration of the energy control mode, the splicing control function may need to be reprogrammed. This is a result of the dynamic characteristics of the splicing control function which may change as the difference between target and actual attenuation changes.

Figure 4:
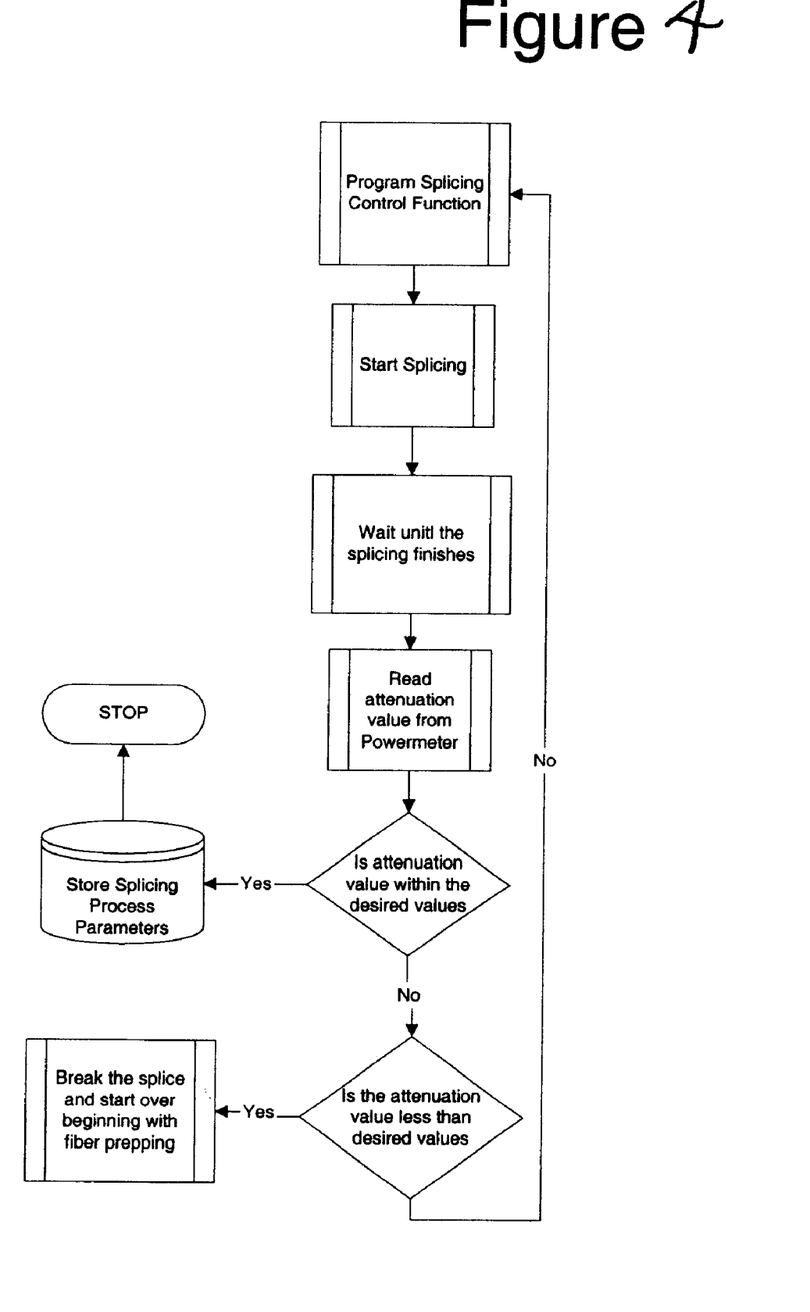
FIG. 4 is a lower level flow diagram showing details of a power mode control method according to the invention for performing attenuation splicing.

The power control mode may also be a stand-alone process as illustrated in FIG. 4. Following standard fiber prepping, the power control mode illustrated in FIG. 4 may be utilized to splice fibers. The details of each step in this process are described above and will not be repeated here. It is important to recognize, however, that the power control mode may be used independently of the energy control mode. The best mode of operating the invention is a combination of power and energy control modes examples of which are shown in FIGS. 3 and 4.

Figure 5:
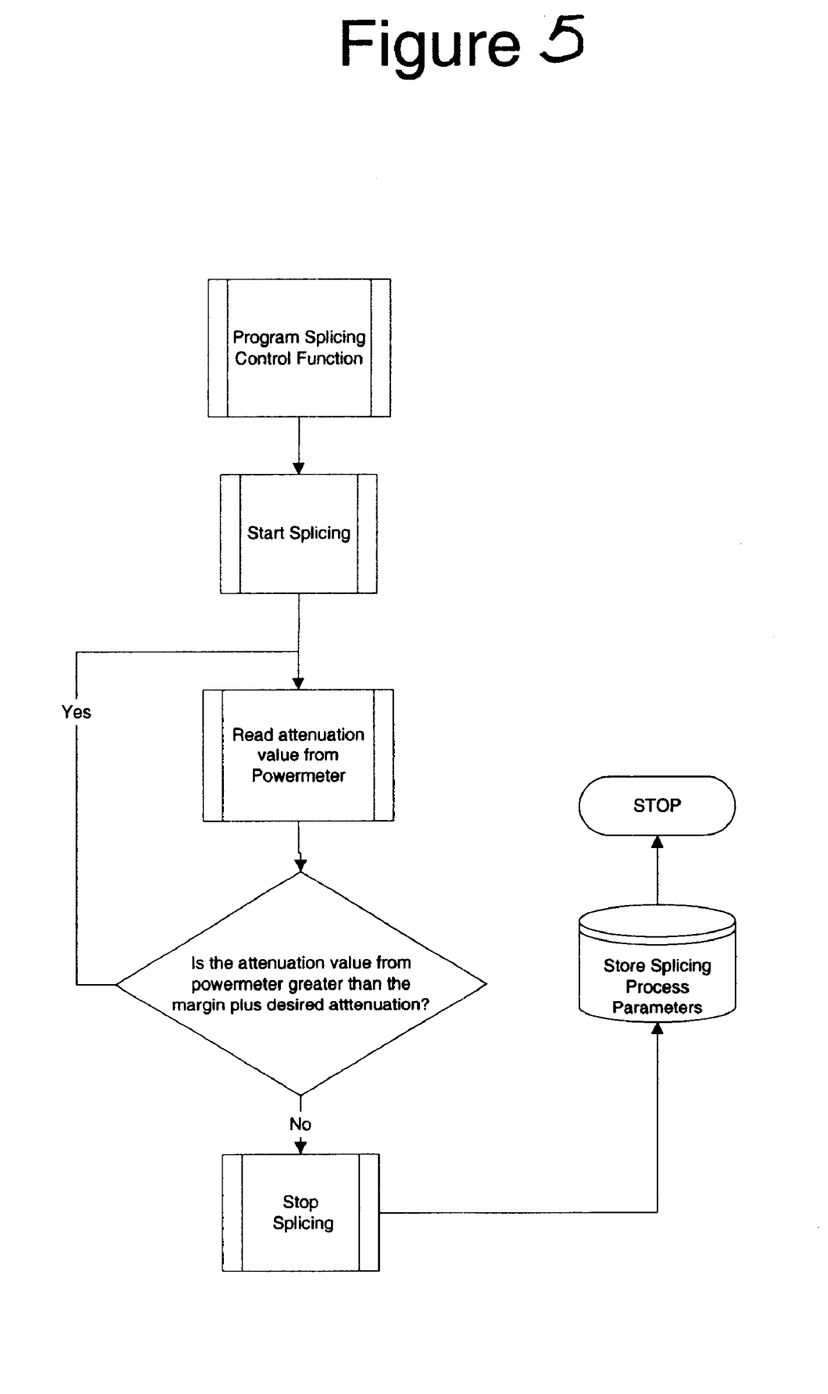
FIG. 5 is a lower level flow diagram showing details of an energy mode control method according to the invention for performing attenuation splicing.

Like the power control mode, the energy control mode may also be a stand-alone process as illustrated in FIG. 5. Following standard fiber prepping, the energy control mode illustrated in FIG. 5 may be utilized to splice fibers. The details of each step in this process are described above and will not be repeated here. It is important to recognize, however, that the energy control mode may be used independently of the power control mode.

Figure 6:
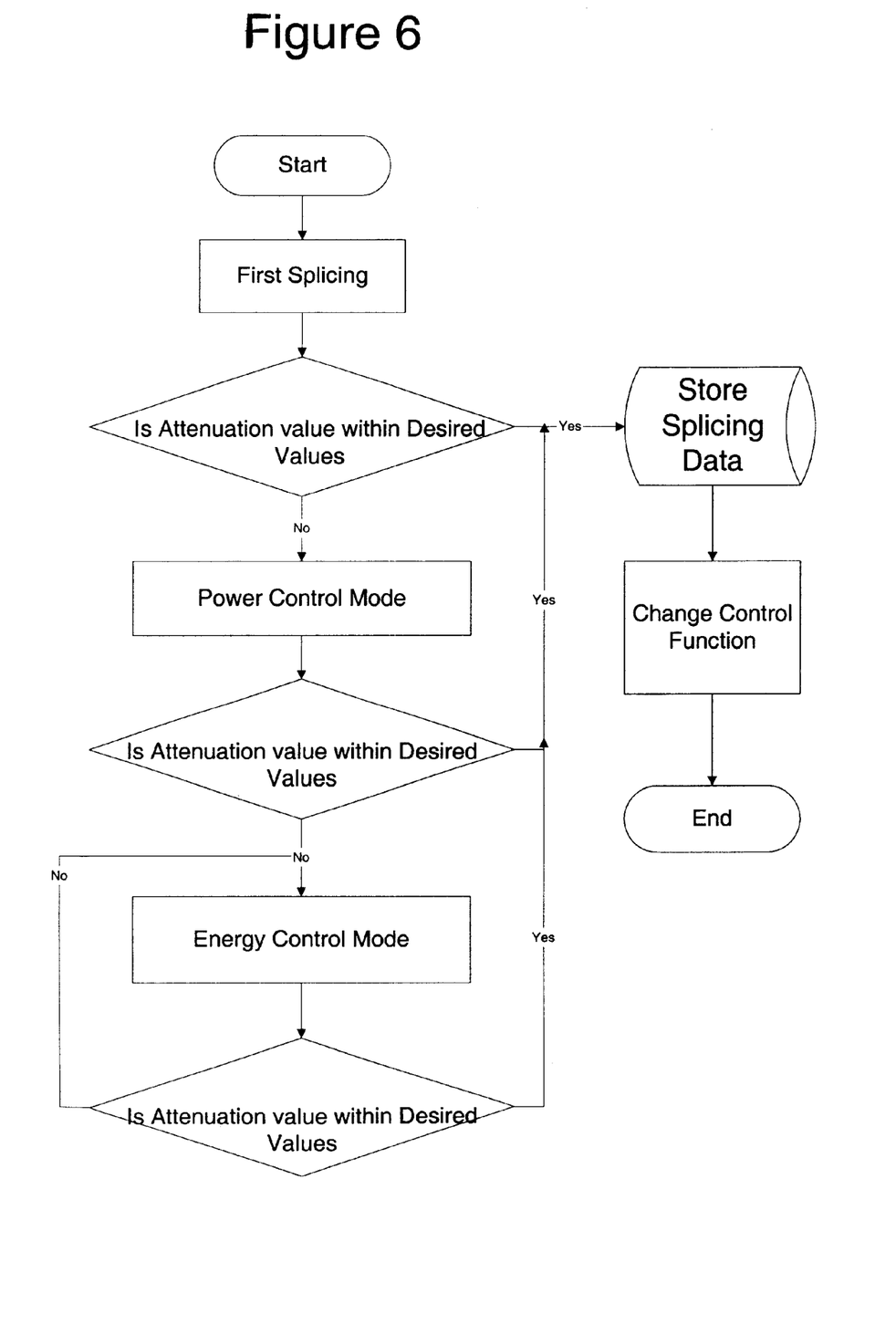
FIG. 6 is a high level flow diagram showing an alternative, combined power mode and energy mode control method having a learning function according to the invention.

FIG. 6 illustrates an alternative method that combines both power and energy control modes. The main difference between FIGS. 2 and 6 is the addition of a change control function step. The inventive methods generate splicing data which may be stored as indicated in FIGS. 2–6 or at any other point in the process. This splicing data may be used, as illustrated in FIG. 6 to update or otherwise change the control functions. These control functions may include the splicing control functions utilized by the power and/or energy control modes. In this way, the invention adapts or learns as splicing operations are performed.

Figure 8:
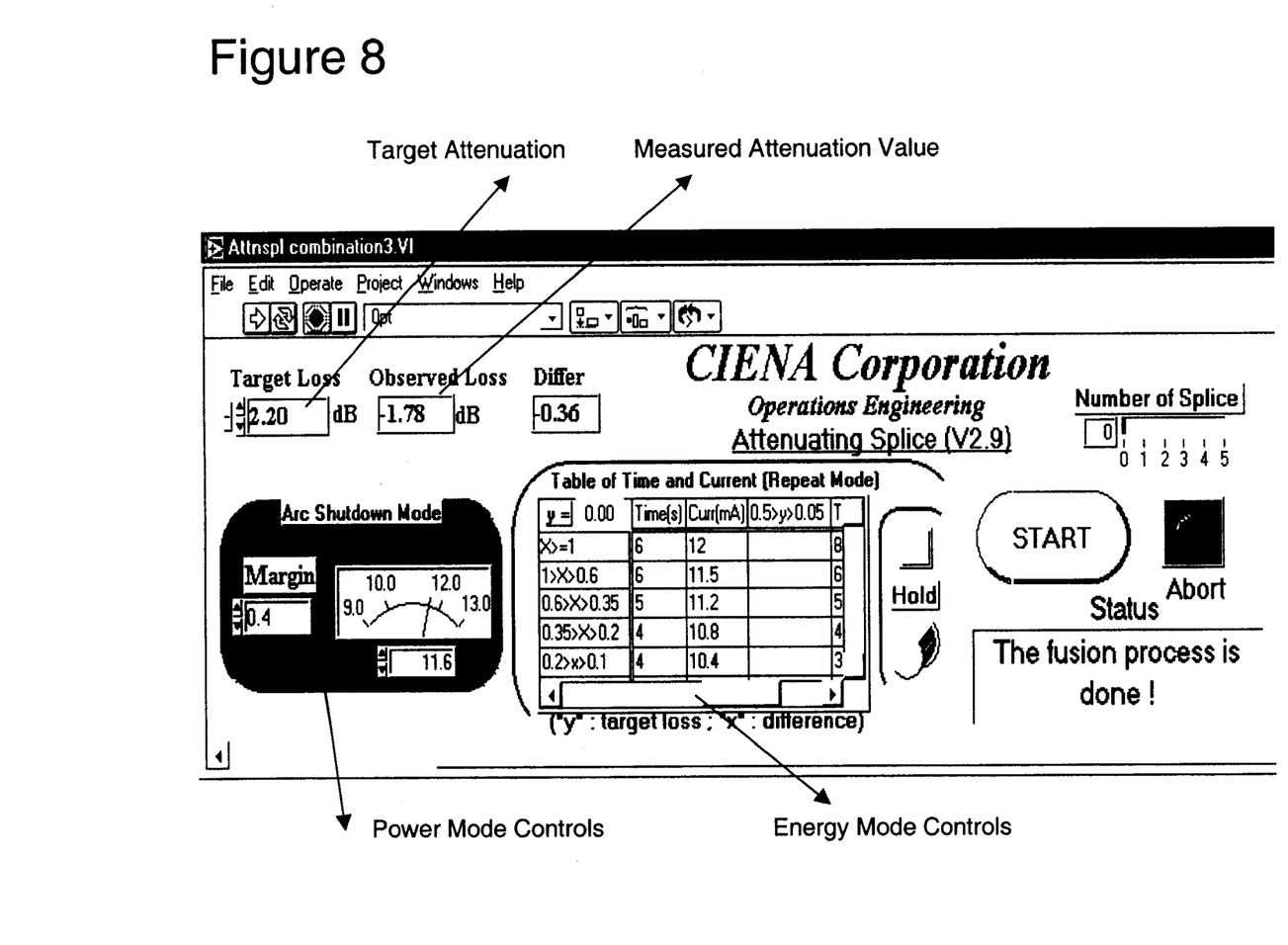
FIG. 8 is an exemplary screen display according to the invention.

FIG. 8 is an example of a screen display that may be generated by the invention. This screen display may be generated by the controller 10 and sent to an appropriate display device. In this way, an operator may conveniently interact with the invention. As shown in FIG. 8, the target loss or target attenuation value may be set by the operator. The observed loss shows the attenuation measured by the power meter 40. The difference therebetween is also conveniently displayed.

FIG. 8 also illustrates an example of power mode controls which may include the margin value and power level (e.g. current I). Illustrative energy mode controls are also shown including target loss Y and difference X (the difference between target loss and measured loss). As shown in the table, the energy level (e.g. time and current) changes depending upon both the target loss and difference. In other words, the energy level may change if the difference value X changes even with the same target value. This further illustrates that the energy control mode may need to change the splicing control function at each iteration even thought the target value is constant. The number of iterations (number of splice) is also indicated by the screen display of FIG. 8. Messages and other control buttons (e.g. Hold and Start) may also be provided as further shown in FIG. 8.

The inventive methodologies disclosed herein produce fiber splices having an extremely accurate attenuation value. The initial goal of the invention was to produce splices having an accuracy of at least +/−0.25 dB. This goal has been surpassed and actual data shows a controlled attenuation to within +/−0.1 dB or better, The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What we claimed is:

1. A method of controlling a fiber optic splicing apparatus to produce an attenuating splice having a target insertion loss value, comprising:

misaligning a first and a second fiber such that their respective optical axes are not aligned;

controlling an amount of power applied by the fiber optic splicing apparatus to fuse the first and second fibers and form the attenuating splice;

measuring an insertion loss of the attenuating splice while the fusing is occurring;

shutting down the power applied by the fiber optic splicing apparatus when the measured insertion loss is less than or equal to the target insertion loss value plus a margin value; and controlling an amount of energy applied by the fiber optic splicing apparatus to adjust the insertion loss of the attenuating splice.

2. The method according to claim 1, said control the amount of energy step controlling the amount of energy by controlling a power applied by the fiber optic splicing apparatus and the time period in which the controlled power is applied.

3. The method according to claim 1, further comprising:

re-measuring the insertion loss of the attenuating splice.

4. The method according to claim 3, further comprising:

repeating said controlling the amount of energy and said re-measuring steps until the re-measured insertion loss is within a desired range of insertion loss values.

5. The method according to claim 4, said control step utilizing a control function relating variables that include the power, the time period, the target insertion loss value and a difference between the target insertion loss value and the re-measured insertion loss to control the amount of energy.

6. The method according to claim 5, further comprising:

changing the control function between at least one iteration of said controlling the amount of energy step and a next iteration thereof.

7. The method according to claim 4, wherein the desired range of insertion loss values is less than +/−0.25 dB.

8. The method according to claim 4, wherein the desired range of insertion loss values is less than +/−0.1 dB.

9. The method according to claim 3, further comprising:
allowing the splice to cool before performing said re-measuring step.

10. The method according to claim 1, further comprising:

storing splicing data relating to the splicing operation.

11. A method of controlling a fiber optic splicing apparatus to produce an attenuating splice, comprising:

misaligning a first and a second fiber such that their respective optical axes are not aligned;

controlling an amount of power applied by the fiber optic splicing apparatus to fuse the first and second fibers and form the attenuating splice;

energizing the first fiber;

measuring an insertion loss of the attenuating splice while the fusing is occurring; and shutting down the power applied by the fiber optic splicing apparatus to fuse the first and second fibers when the measured insertion loss is less than or equal to a desired attenuation value plus a margin value.

12. The method according to claim 11, further comprising: storing splicing data relating to the splicing operation.

13. An apparatus for controlling a fiber optic splicing machine to splice a first and a second fiber, comprising:
- a controller operatively connected to the fiber optic splicing machine;
- a laser operatively connected to the first fiber;
- a power meter operatively connected to said controller and to the second fiber;
- said controller controlling the fiber optic splicing machine to misalign the first and second fibers such that their respective optical axes are not aligned;
- said controller controlling an amount of power applied by the fiber optic splicing machine to fuse the first and second fibers and form an attenuating splice;
- said controller controlling the laser to energize the first fiber;
- said power meter measuring an insertion loss of the attenuating splice while the fusing is occurring;
- said controller receiving the measured insertion loss and shutting down the power applied by the fiber optic splicing machine to fuse the first and second fibers when the measured insertion loss is less than or equal to a desired attenuation value plus a margin value.

14. The apparatus according to claim 13, further comprising:
- a memory device operatively connected to said controller,
- said controller storing splicing data relating to the splicing operation in said memory device.

15. The apparatus according to claim 13,
- said controller controlling an amount of energy applied by the fiber optic splicing machine to adjust the insertion loss of the attenuating splice,
- said controller controlling the amount of energy by controlling a power applied by the fiber optic splicing machine and the time period in which the controlled power is applied.

16. The apparatus according to claim 15,
- said controller controlling said power meter to re-measure the insertion loss of the attenuating splice.

17. The apparatus according to claim 16,
- said controller repeating said controlling the amount of energy and said re-measuring until the re-measured insertion loss is within a desired range of insertion loss values.

18. The apparatus according to claim 17,
- said controller controlling the amount of energy by utilizing a control function relating variables that include the power, the time period, the target insertion loss value and a difference between the target insertion loss value and the re-measured insertion loss.

19. The apparatus according to claim 18, further comprising:
- a memory device operatively connected to said control unit, said memory device storing splicing data relating to the splicing operation; and
- said controller changing the control function according to the stored splice data stored by said memory device.

* * * * *